United States Patent [19]

Roman et al.

[11] Patent Number: 5,721,050

[45] Date of Patent: Feb. 24, 1998

[54] GLASS POLYHEDRONS

[75] Inventors: Daniel Roman, La Ferte Sous Jouarre; Alain Bonnetin, Coulommiers, both of France

[73] Assignee: Saint Gobain Vitrage International, Courbevoie, France

[21] Appl. No.: 792,706

[22] Filed: Jan. 29, 1997

Related U.S. Application Data

[63] Continuation of Ser. No. 253,914, Jun. 3, 1994, abandoned.

[30] Foreign Application Priority Data

Jun. 3, 1993 [FR] France .................. 93 06631

[51] Int. Cl.[6] ........................... D02G 3/18
[52] U.S. Cl. .......................... 428/397; 428/401
[58] Field of Search ................ 428/397, 398, 428/399, 400, 401; 65/437, 497; 501/35

[56] References Cited

U.S. PATENT DOCUMENTS

| | | |
|---|---|---|
| 3,063,094 | 11/1962 | Warthen . |
| 3,668,304 | 6/1972 | Eilenberger ............ 178/5.4 ST |
| 4,590,492 | 5/1986 | Meier ..................... 346/107 R |
| 4,759,784 | 7/1988 | Shono et al. . |
| 4,885,020 | 12/1989 | Nishino et al. . |
| 5,181,947 | 1/1993 | Mizuno et al. . |
| 5,264,722 | 11/1993 | Tonucci et al. ............ 257/443 |
| 5,306,661 | 4/1994 | Tonucci et al. ............. 437/90 |

FOREIGN PATENT DOCUMENTS 50-28413  3/1975  Japan .

OTHER PUBLICATIONS

Proceedings of the VII International Congress on Glass, Jun. 28–Jul. 3, 1965; R.A. Humphrey, "Forming Glass Filaments with Unusual Cross Sections", pp. 77.1 & 77.8.

Primary Examiner—Donald E. Czaja
Assistant Examiner—Sean Vincent
Attorney, Agent, or Firm—Oblon, Spivak, McClelland, Maier & Neustadt, P.C.

[57] ABSTRACT

Glass polyhedrons that can be used particularly as spacers and make it possible to maintain a space between two glass sheets. These polyhedrons have an approximately polygonal section whose dimension are less than a millimeter and whose corners are rounded with a radius of curvature of less than 10 microns.

18 Claims, 2 Drawing Sheets

GLASS POLYHEDRONS

This application is a Continuation of application Ser. No. 08/253,914 filed on Jun. 3, 1994, now abandoned.

BACKGROUND OF THE INVENTION

1. Field of the Invention

The invention relates to glass polyhedrons that can be used particularly as spacers which make it possible to maintain a space between two sheets of materials such as glass. More particularly, the invention relates to spacers which make possible the production of a unit of two glass sheets by keeping them separated by a space of limited thickness that is generally less than a millimeter over the entire surface of the glass sheets.

2. Description of the Related Art

Such a system of glass sheets is used in particular for the production of display-type screens, regardless of the technology; it involves, for example, plasma display screens, microdot display screens, electroluminescence display screens, etc. Actually, a limited space must be maintained for the production of these screens so as in particular to create a vacuum between the two glass sheets.

This type of screen and more particularly the exterior glass sheet, i.e., the glass sheet that is toward an observer exhibits a transparency. The spacers which make it possible to maintain a spacing must consequently be the least visible possible.

A solution that is currently known consists in making glass spacers particularly in the shape of balls or else in the shape of cylinders that can have certain similarities with glass fibers. These spacers are generally polished so as to be the least visible possible.

These spacers seem to be able to be easily produced industrially, but their use poses problems of stability. Actually, the rounded shapes cause rollings during positioning and possibly after assembly.

To eliminate this problem, it has been considered to produce glass spacers that also have certain similarities with fibers but with a rectangular-type section.

These spacers contribute an improved stability because of plane contact surfaces with the glass sheets. On the other hand, these spacers having a rectangular-type section exhibit edges that can damage the glass sheets. Now, to produce a display screen, the glass sheets generally comprise layers that have been previously deposited.

The edges of the spacers exhibit a danger particularly in case of slipping. They can cause damage to the layers deposited on the glass sheets and even score the glass sheets.

Another drawback resides in the preparation of these spacers. They are generally made by machining, which does not make it possible to obtain a regularity of the dimensions of the section.

On the other hand, to improve the optical transparency, the spacers are polished on all their faces. The lateral faces are polished with relative ease, but the end faces corresponding to the section are polished only with great difficulty and with very considerable production costs because the polishing is performed spacer by spacer.

SUMMARY OF THE INVENTION

An object of the present invention involves the production of glass polyhedrons that can be used particularly as spacers, for the type of application considered, which eliminate the cited drawbacks and which in particular do not run the risk of damaging the other elements, and exhibit an optical quasi-transparency during their use.

A further object of the present invention relates to a production process for making these polyhedrons at less cost and with precise dimensions.

According to the invention, these objects are reached by the production of glass polyhedrons that can be used in particular as spacers, for the separation of two glass sheets that can comprise layers deposited on the opposite faces, having an approximately polygonal section whose dimensions of the sides are less than a millimeter and whose corners are rounded with a radius of curvature less than 10 microns and preferably between 2 and 4 microns.

One of the dimensions of the polyhedron is advantageously much greater than the others and preferably at least ten times larger.

Preferably, the section of these spacers has a shape close to that of a parallelogram.

Again preferably, the section is approximately square. Advantageously, the sides of the section have dimensions between 30 microns and 1 millimeter, and preferably between 50 and 200 microns. For particular applications, and to facilitate their positioning, the polyhedrons can be approximately cubical.

These spacers advantageously are produced with a tolerance of the dimensions that is less than a micron and with a good regularity.

These spacers make it possible to maintain a space between two glass sheets in a stable manner.

Actually, the contacts between the glass sheets and the spacers occurs along plane surfaces. Furthermore, the corners which have been rounded with radii of curvature less than 10 microns, make it possible to keep a polygonal-type general shape and therefore plane surfaces for the contacts between spacers and glass sheets.

In addition, these roundings prevent all dangers of degradation of the surfaces of the glass sheets or further of the layers which have been deposited.

According to a preferred method of the invention, the spacers are polished on all or certain of their faces.

In this way, when they are used for the separation of two glass sheets, they are only very slightly visible.

Furthermore, the fact that these spacers having a polygonal section have "rounded corners" also contributes to render them not very visible since they have no lateral edge.

Advantageously, these spacers are made with a glass having the same index of refraction as the glass sheets that form the screen.

On the other hand, a glass of optical quality which does not exhibit any bubble is advantageously selected.

The invention also proposes a process for the production of these glass polyhedrons that are used in particular as spacers. This process comprises several stages. First of all, a blank bar or rod of glass is drawn which exhibits a section with a shape that is approximately identical with the one that it is desired to obtain except for a homothetic ratio. This blank bar which has a sufficiently large size can be machined according to the desired section, with a great precision. In addition, this blank bar is initially polished on its lateral faces.

This drawing stage is performed with an elevation of the temperature of the blank bar to a temperature close to its softening temperature and the drawing itself is then performed in at least two stages.

The dimensions required for the applications of these spacers are such that it is preferable to draw the blank bar in at least two stages, which makes it possible to have dimensions of the sides of the section of the blank bar on the order of one or more tens of millimeters. The blank bar is then easily machinable.

The drawn bar obtained after drawing of the blank bar exhibits a section with a shape similar to that of the blank bar except for a homothetic ratio and maintains a polished appearance on its lateral faces.

Furthermore, this polished appearance is maintained because of the transition to high temperature which creates a "fire polish." This phenomenon can make it possible to use not a blank bar polished on its lateral faces but exhibiting a "fine grinding" appearance.

This drawn bar is then cut into several elements that are again drawn to result in rods that exhibit the section of the desired spacers and which always maintain a polished appearance on the lateral faces.

These rods are gathered together parallel to one another. Preferably, these rods are gathered together in a cylinder, particularly of glass, and are made solid with one another using a wax with a low melting point.

The assembly of rods is then cut to the desired length so that they form the desired spacers.

The length being obtained, the assembly of the spacers (or rods) is polished at both ends. It is thus possible to obtain spacers polished on all their faces. Furthermore, if the cut is not very precise, it is possible to rectify the length of the spacers during polishing.

The spacers are then separated from one another, particularly by melting of the wax, or by chemical dissolution.

The process thus described makes it possible to obtain spacers with precise dimensions and at lower cost. Actually, the manual operations performed by an operator are very limited. On the one hand, this reduces production costs and, on the other hand, the operations resulting in the dimensions not being manual are both precise and regular.

The invention also proposes a device for putting this process into practice.

The device proposed for the production of glass polyhedrons of polygonal section whose sides are less than 1 millimeter comprises heating means, drawing means and means for the cutting and the polishing.

According to an embodiment of the invention, the heating means are a ring heated by a low voltage Joule effect that is associated with a mechanical system making possible the advancement of the blank bar within the ring. It is possible in this way to control with precision the temperature of the blank bar.

In a preferred way, the drawing means are composed of two driven belts. The belts are advantageously made of a material that prevents slipping on glass. In particular, they can be made of silicone.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
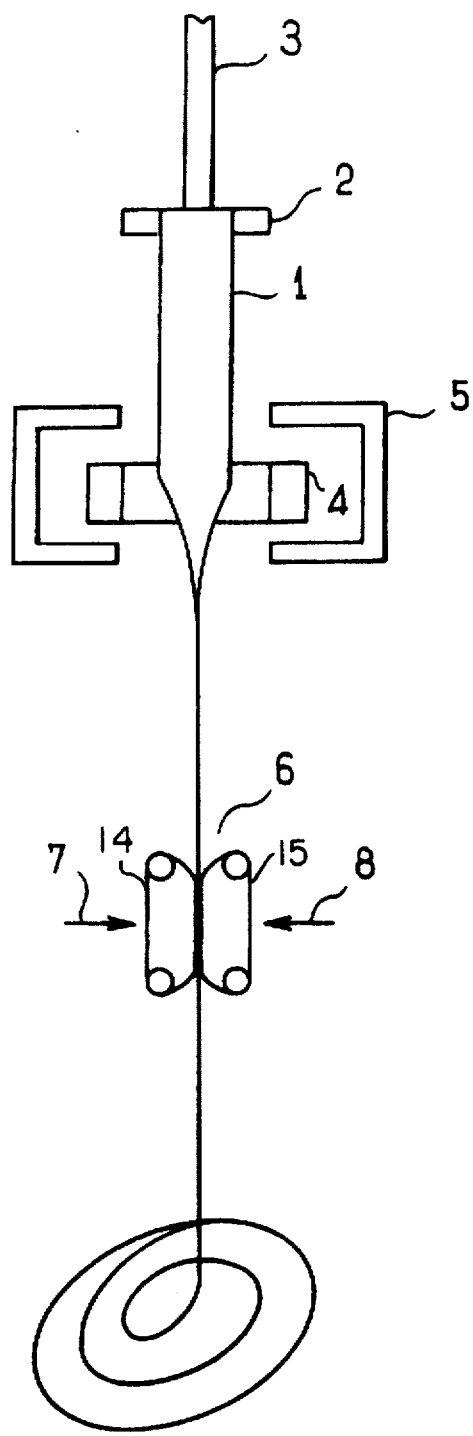
FIG. 1 shows a diagram of an example of a device according to the invention.

Referring now to the drawings, FIG. 1 describes the diagram of an installation for the production of spacers having polygonal sections whose sides have dimensions less than a millimeter and that can be on the order of several tens of microns.

Blank bar 1 having a polygonal-type section is fastened to a support 2. The blank bar has been initially prepared, i.e., has been machined according to a section corresponding approximately after drawing to the section desired for the spacers except for a homothetic ratio. Furthermore, all the lateral faces have been polished.

Support 2 is itself attached to a mechanical system whose shaft 3 is shown in the diagram.

This mechanical system, which can be for example an endless screw, makes it possible to impart a descending vertical movement to the blank bar 1 which can thus pass through a heating ring 4. The heating ring 4 is heated by a low-voltage Joule effect. Such a heating system can be regulated to plus or minus 0.1 degree. This makes it possible to raise the temperature of the blank bar 1 to the desired temperature with a great precision.

The heating ring 4 is surrounded by an insulation refractory 5. The height of the heating ring is about 70 millimeters. Placed under the heating device at a distance of about 500 millimeters, a device 6 makes possible the drawing of the blank bar. This device is composed of two driven belts 14, 15. The driving force of these belts 14, 15 makes possible the drawing of the blank bar.

The belts 14, 15 are made of a material which make it possible to prevent slipping on the glass and therefore to obtain a regular drawing. They are, for example, made of silicone.

The length of the contact zone between the belts 14, 15 and the drawn bar is about 100 mm.

On the other hand, elements not shown in FIG. 1 exert lateral pressure forces 7, 8 on the belts 14, 15 and thus facilitate the drawing. These elements are, for example, small adjustable pressure cylinders.

The device thus presented in FIG. 1 makes possible the drawing of the blank bar for the production of spacers.

It appears that according to this drawing process, it is possible to keep almost the same profile, i.e., approximately the same section shape between the blank bar 1 and the drawn bar, with a homothetic ratio between the two.

It is possible to perform the drawing in a single stage, but it is advantageous to perform it in at least two stages. Actually, it is preferable to start with a blank bar whose dimensions of the sections are on the order of ten millimeters. These dimensions facilitate the machining of the blank bar. The final dimensions desired for the spacer are on the order of several tens of microns. A drawing making possible the direct transition to the final dimensions of the spacers would be too extensive.

It is therefore preferable to go through an intermediate state whose dimensions are then on the order of a millimeter. During the first drawing, the drawn bar is cut into several elements after passing between the two belts. These elements are then drawn according to the same process. The element obtained has the section of the desired spacers. The dimensions of this element make a flexible element of it that is coiled under the drawing device.

Figure 2A:
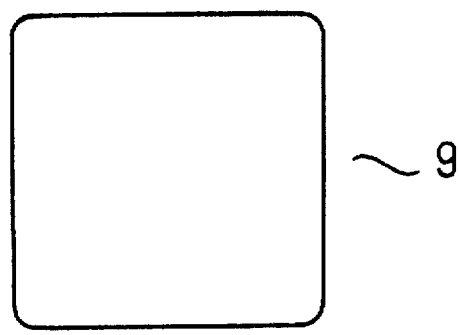
FIGS. 2a, 2b and 2c show diagrams of sections of spacers obtained according to the invention.
Figure 2B:
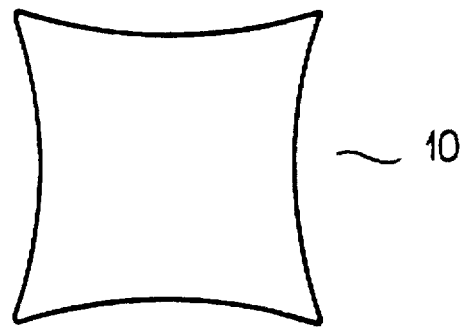
Figure 2C:
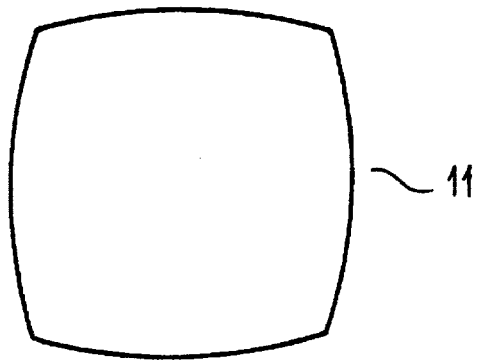

In FIGS. 2a–2c, three different profiles of the bar are shown after a double drawing.

Profile 9 of FIG 2a corresponds to a desired spacer profile of square section. Undesirable profiles 10 (FIG. 2b) and 11 (FIG. 2c) are obtained from the same blank bar but with different operating conditions. Profile 10 corresponds in particular to a temperature of ring 4 that is too low and profile 11 to a temperature that is too high.

The different parameters, which are the passing speed of the bar in the ring, the temperature of the ring, the drive speed of the belts as well as the pressure forces 7, 8 exerted by the belts on the element already drawn, must be regulated so as to obtain the desired dimensions after drawing while keeping the initial shape given to the blank bar.

There are no defined laws that make it possible to combine these various parameters. Furthermore, their values vary as a function of the desired section shape and its dimensions.

These values are therefore established empirically by a manipulator who can also establish nomographs by performing tests.

The drawn bar which is coiled on the receiving table is then collected by an operator who divides it into a multitude of fine "rods." He gathers these rods together in a glass tube and he pours out a wax so that the rods are held fast and solid with one another.

This wax is, for example, an optical resin having a low melting point, on the order of 60° to 70° C.

After cooling, the unit, formed by the glass tube containing the rods held by the wax, can be cut for example using a wire saw, in the shape of disks. The thickness of the glass tube disks corresponds to the desired length of the spacers, which is generally much greater than the other dimensions, for example a hundred times greater.

Each surface of the disks is then polished. This polishing makes it possible to polish each end of the rods contained in the disks. This technique is very advantageous; it makes it possible on the one hand, to rectify with greater precision the length of the rods and, on the other hand, it is possible to polish the ends of the rods not one by one but all together.

The polishing finished, the operator raises the temperature of the unit so as to melt the wax or attacks it chemically with a solvent and collects the rods with a filter.

Then, all that remains is to package these rods or spacers.

The device described that puts the process according to the invention into practice makes it possible to produce spacers that are, in particular, used for the separation of two glass sheets for a plasma display screen.

Furthermore, according to the invention, it is possible to obtain a very good regularity of the dimensions of the spacers obtained.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. A glass spacer for use between two glass sheets, wherein said glass spacer is in the shape of a polyhedron having a section which is approximately of polygonal type in which all sides define a plane surface and have dimensions which are less than a millimeter, such that contact between the glass sheets and the glass spacer occurs along the plane surfaces, said glass spacer having corners which are rounded and have no lateral edges, wherein the corners have a radius of curvature greater than zero and less than 10 microns.

2. A glass spacer according to claim 1, wherein the radius of curvature is between 2 and 4 microns.

3. A glass spacer according to one of claims 1 or 2, wherein the section is of the parallelogram type.

4. A glass spacer according to claim 3, wherein the section is square.

5. A glass spacer according to claim 4, wherein one of the dimensions of the sides is greater than the others.

6. A glass spacer according to claim 4, wherein the dimensions are approximately cubical.

7. A glass spacer according to claim 6, wherein the sides of the section have dimensions between 30 microns and 1 mm.

8. A glass spacer according to claim 1, wherein the polyhedron is made with a tolerance of the dimensions that is less than a micron.

9. A glass spacer according to claim 1, wherein the polyhedron is polished on at least one of its faces.

10. A glass spacer according to claim 1, wherein the spacer separates two glass sheets that can comprise surface layers.

11. A glass spacer according to claim 10, wherein an index of refraction of the polyhedron is identical with that of the glass sheets.

12. A glass spacer according to claim 1, wherein the polyhedron maintains a space between two plates of materials.

13. A glass spacer according to claim 10, wherein the polyhedron maintains a space between two glass sheets in a production of a display-type screen.

14. A glass spacer according to claim 4, wherein one of the dimensions of the sides is ten times greater than the others.

15. A glass spacer according to claim 6, wherein the sides of the section have dimensions between 50 microns and 200 microns.

16. A glass spacer according to claim 13, wherein the display-type screen is a plasma display screen.

17. A glass spacer according to claim 13, wherein the display-type screen is a microdot display screen.

18. A glass spacer according to claim 13, wherein the display type screen is an electroluminescence display screen.

* * * * *